United States Patent [19]

Landholm et al.

[11] 4,156,609

[45] May 29, 1979

[54] PHOTOGRAPHIC PRODUCTS AND PROCESSES EMPLOYING AZO DYES, AZO DYE-RELEASING COMPOUNDS

[75] Inventors: Richard A. Landholm, Canandaigua; Jerry M. Robbins, Rochester, both of N.Y.

[73] Assignee: Eastman Kodak Company, Rochester, N.Y.

[21] Appl. No.: 850,179

[22] Filed: Nov. 10, 1977

[51] Int. Cl.² .......................... G03C 7/00; G03C 1/40
[52] U.S. Cl. .......................................... 96/29 D; 96/3; 96/56.1; 96/73; 96/77; 96/99
[58] Field of Search ................ 96/99, 77, 100 R, 56.1, 96/3, 29 D

[56] References Cited

U.S. PATENT DOCUMENTS

| | | | |
|---|---|---|---|
| B 351,673 | 1/1975 | Fleckenstein | 96/3 |
| 3,257,379 | 6/1966 | May et al. | 260/196 |
| 3,364,022 | 1/1968 | Barr | 96/56.1 |
| 3,883,503 | 5/1975 | Van Assche et al. | 8/41 B |
| 3,942,987 | 3/1976 | Landholm et al. | 96/99 |
| 3,954,476 | 5/1976 | Krutak et al. | 96/77 |
| 3,980,479 | 9/1976 | Fields et al. | 96/3 |
| 4,009,029 | 2/1977 | Hammond et al. | 96/99 |

FOREIGN PATENT DOCUMENTS 12942  3/1957  German Democratic Rep. ....... 96/100

OTHER PUBLICATIONS

Research Disclosure No. 15157, pp. 68–74, Nov. 1976.

*Primary Examiner*—J. Travis Brown
*Attorney, Agent, or Firm*—Joshua G. Levitt

[57] ABSTRACT

Photographic elements, diffusion transfer assemblages and processes are described which employ a novel non-diffusible compound having a novel releasable azo dye. The dyes are azophenols, or precursors of azophenols, and have electron withdrawing groups in each of the positions ortho to the phenolic hydroxy group.

37 Claims, No Drawings

PHOTOGRAPHIC PRODUCTS AND PROCESSES EMPLOYING AZO DYES, AZO DYE-RELEASING COMPOUNDS

This invention relates to azo dyes and dye-releasing compounds useful in photography. In a particular aspect it relates to color diffusion transfer photography employing certain nondiffusible azo dye-releasing compounds, which, as a function of development of a silver halide emulsion layer, release a diffusible azo dye.

Color diffusion transfer processes generally involve the use of a photographic element comprising a support, at least one silver halide emulsion layer and an image dye-providing material which is contained in or contiguous said layer. After exposure, the photographic element is treated with an alkaline processing solution to effect imagewise development of silver halide and imagewise dye discrimination. The imagewise dye discrimination is generally brought about by a monitoring or carrier group which, in the presence of the alkaline processing solution, is responsible for a substantial change in the diffusibility of at least the dye portion of the dye-providing material. As is known in the art, the dye-providing material can be initially immobile or initially mobile in the processing solution. In an element containing an initially immobile dye-providing material, alkaline processing results in release of a diffusible dye imagewise. In an element containing an initially mobile dye-providing material, alkaline processing results in the material being rendered insoluble (and thus immobile) in an imagewise fashion.

It is well known in the art to utilize image dye-providing materials in a photographic element wherein an imagewise exposed element can be contacted with an alkaline processing solution to effect an imagewise difference in mobility of at least a portion of the dye-providing material, i.e., to effect release of a dye or dye precursor, to render said compound diffusible. Exemplary dye releasing compounds of this type, and photographic elements employing them, are described in U.S. Pat. No. 4,076,529 issued Feb. 28, 1978; U.S. Pat. No. 3,980,479; U.S. Patent application Ser. No. 534,966 filed Dec. 20, 1974 and U.S. Patent application Ser. No. 775,025 filed Mar. 7, 1977.

The yellow dye releasing compounds described in these and associated disclosures are highly useful. However, it would be desirable to provide improved compounds which release yellow dyes having improved stability to heat, light and chemical reagents and better hues.

We have found that this can be accomplished with novel yellow azophenol dyes having electron withdrawing groups in each of the positions ortho to the phenolic hydroxy group and with novel nondiffusible compounds which release such azo dyes, or precursors of such azo dyes, as a function of silver halide development. Accordingly, our invention relates to novel dyes, novel nondiffusible dye releasing compounds, photographic elements and assemblages containing these dye releasing compounds and processes of forming photographic images employing these elements and assemblages.

A photographic element in accordance with our invention comprises a support having thereon at least one photosensitive silver halide emulsion layer having associated therewith a nondiffusible compound having a releasable azo dye moiety which is diffusible under alkaline conditions when released from the compound, said compound having the formula:

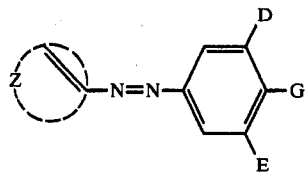

wherein:

D is an electron withdrawing group (i.e., a group having a Hammett para sigma value greater than 0, and preferably between 0 and +1.5);

E is a strong electron withdrawing group (i.e., a group having a Hammett para sigma value greater than +0.3, and preferably between +0.3 and +1.5);

Z represents the atoms necessary to complete an aromatic carbocyclic or heterocyclic nucleus having at least one ring of 5 to 7 atoms (e.g., phenyl, pyridyl, naphthyl, pyrazolyl, indolyl, etc.);

G is hydroxy or a hydrolyzable precursor thereof; and, attached to one of the rings, a ballasted carrier moiety capable of releasing the diffusible azo dye under alkaline conditions as a function (either direct or inverse) of development of the silver halide emulsion layer.

Exemplary Hammett para sigma values and procedures for their determination are set forth by J. Hine in Physical Organic Chemistry, 2nd edition, p. 87, published in 1962; by H. VanBekkum, P. E. Verkade and B. M. Wepster in Rec. Trav. Chim, Volume 78, Page 815, published in 1959; by P. R. Wells in Chem. Revs., Volume 63, Page 171, published in 1963; by H. H. Jaffe, Chem. Revs., Volume 53, Page 191, published in 1953; by M. J. S. Dewar and P. J. Grisdale in J. Amer. Chem. Soc., Volume 84, Page 3548, published in 1962; and by Barlin and Perrin in Quart. Revs., Volume 20, Page 75 et seq., published in 1966.

In a preferred embodiment of our invention, Z represents the atoms necessary to complete an aryl group such as a phenyl group which can be substituted with one or more non-interfering substituents such as halogen (e.g., chloro, fluoro, bromo, iodo), lower alkyl (e.g., methyl, ethyl, propyl, butyl), lower alkoxy (e.g., methoxy, ethoxy, propoxy, butoxy), or acid or acid derivative substituents such as acids, esters and amides (e.g., sulfo, sulfonamido, sulfamoyl, carboxy, carboxamido or carbamoyl groups which can be unsubstituted or substituted with lower alkyl or lower aryl groups). As used herein lower alkyl and lower alkoxy refer to such groups containing 1 to 4 carbon atoms while lower aryl refers to aryl groups of 6 to 9 carbon atoms such as phenyl, benzyl, tolyl, methoxyphenyl, chlorophenyl and the like. In a particularly preferred embodiment the ballasted carrier moiety is attached to the ring completed by Z.

In a preferred embodiment of our invention D is an electron withdrawing group selected from halogen, nitro, cyano, carboxy, sulfonyl, sulfamoyl, or lower perfluoroalkyl and E is a strong electron withdrawing group selected from nitro, cyano, carboxy, sulfonyl, sulfamoyl or lower perfluoroalkyl. The sulfamoyl group can be unsubstituted, substituted with lower alkyl, lower aryl or heterocyclic groups or can form a part of the ballasted carrier moiety which is cleaved from the carrier when the dye is released. The sulfonyl group can be substituted with a lower alkyl, lower aryl or heterocyclic groups or can form a part of the ballasted carrier moiety.

In a preferred embodiment of our invention G is hydroxy or a hydrolyzable ester group of the formula

where each $R^1$ is independently alkyl of 1 to 8 carbon atoms, aryl of 6 to 12 carbon atoms or a group which together with the

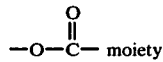 moiety is the ballasted carrier moiety.

The azo dyes of our invention have the structure I, above, except that they do not contain a ballasted carrier moiety. The dyes can, however, contain a residue of a ballasted carrier moiety when, for example, they are released from the nondiffusible compound. When G is a hydroxy group the dyes are azophenols and typically are yellow in color. When G is a hydrolyzable precursor of a hydroxy group the absorption spectrum of the dye is shifted to shorter wavelengths and when such a G group is hydrolyzed, such as under alkaline conditions encountered during processing, the yellow color of the azophenol dye is obtained.

There is great latitude in selecting a ballasted carrier moiety in the azo dye releasing compounds described above. Depending upon the nature of the ballasted carrier moiety selected, various groups may attach or link the carrier moiety to the azo dye. Such linking groups are considered to be a part of the ballasted carrier moiety in the above definition. It should be noted that when the dye moiety is released from the compound, cleavage may take place in such a position that part or all of a linking group, or even other parts of the ballasted carrier moiety, may remain attached to the dye.

Ballasted carrier moieties useful in the invention are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Pat. No. 602,607; British Pat. No. 1,464,104; Research Disclosure 14447, April 1976; and U.S. application Ser. No. 775,025, filed Mar. 7, 1977 of Chasman et al (dye released by miscellaneous mechanisms), the disclosures of which are hereby incorporated by reference.

In a further preferred embodiment of the invention, the ballasted carrier moiety may be represented by the following formula:

(BALL-CAR-LINK)-     II wherein:

(a) BALL is an organic ballasting radical of such molecular size and configuration as to render the compound nondiffusible in a photographic element during development in an alkaline processing composition;

(b) CAR is an oxidizable acyclic, carbocyclic or heterocyclic moiety;

(c) LINK represents a group which upon oxidation of said CAR moiety is capable of being hydrolytically cleaved to release the diffusible azo dye. For example, LINK may be the following groups:

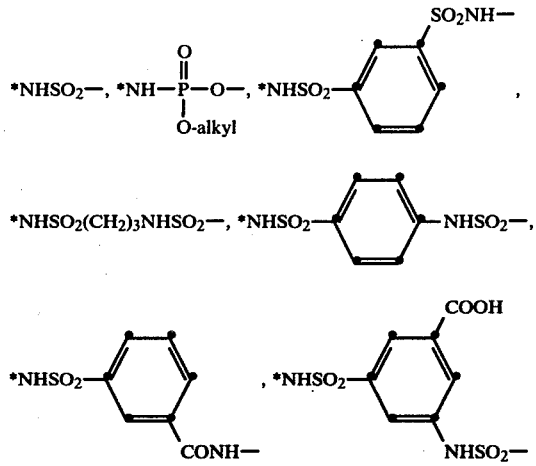

wherein * represents the position of attachment to CAR.

The ballast group in the above formula is not critical as long as it confers nondiffusibility to the compound. Typical ballast groups include long-chain alkyl radicals linked directly or indirectly to the compound as well as aromatic radicals of the benzene and naphthalene series indirectly attached or fused directly to the carbocyclic or heterocyclic nucleus, etc. Useful ballast groups generally have at least 8 carbon atoms such as substituted or unsubstituted alkyl groups of 8 to 22 carbon atoms, a carbamoyl radical having 8 to 30 carbon atoms such as —CONH(CH$_2$)$_4$—O—C$_6$H$_3$(C$_5$H$_{11}$)$_2$, —CON(C$_{12}$H$_{25}$)$_2$, etc, a keto radical having 8 to 30 carbon atoms such as —CO—C$_{17}$H$_{35}$, —CO—C$_6$H$_4$-(t—C$_{12}$H$_{25}$), a sulfamoyl radical having 8 to 30 carbon atoms such as —SO$_2$NHC$_{12}$H$_{25}$, etc.

For specific examples of BALL-CAR-LINK- moieties useful as the ballasted carrier moiety in this invention, reference is made to the November 1976 edition of Research Disclosure, pages 68 through 74, and the April 1977 edition of Research Disclosure, pages 32 through 39, the disclosures of which are hereby incorporated by reference.

In one highly preferred embodiment of the invention, the ballasted carrier moiety is such that the diffusible azo dye is released as a direct function of development of the silver halide emulsion layer under alkaline conditions. This is ordinarily referred to as negative-working dye-release chemistry. In one such embodiment the ballasted carrier moiety is a group having the formula:

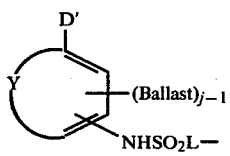

wherein:

(a) Ballast is an organic ballasting radical of such molecular size and configuration (e.g., simple organic groups or polymeric groups) as to render the compound nondiffusible in a photographic element during development in an alkaline processing composition;

(b) D' is $OR^2$ or $NHR^3$ wherein $R^2$ is hydrogen or a hydrolyzable moiety and $R^3$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, octadecyl, dodecyl, benzyl, phenethyl, etc. (when $R^3$ is an alkyl group of greater than 8 carbon atoms, it can serve as a partial or sole ballast);

(c) —$NHSO_2L$— is ortho or para to D';

(d) Y represents the atoms necessary to complete a benzene nucleus, a naphthalene nucleus, or a 5 to 7 membered heterocyclic ring such as pyrazolone, pyrimidine, etc.;

(e) j is a positive integer of 1 to 2 and 2 when D' is $OR^2$ or when $R^3$ is hydrogen or an alkyl group of less than 8 carbon atoms; and (f) L is a linking group which is —$[X—(NR^4—J)_q-]_m$— or —$X—J—NR^4$— wherein:

(i) X represents a bivalent linking group of the formula —$R^5—L'_n—R^5_p$— where each $R^5$ can be the same or different and each represents an alkylene radical having 1 to about 8 carbon atoms, such as methylene, hexylene and the like; a phenylene radical; or a substituted phenylene radical having 6 to about 9 carbon atoms, such as methoxy phenylene;

(ii) L' represents a bivalent radical selected from oxy, carbonyl, carboxamido, carbamoyl, imino, sulfonamido, ureylene, sulfamoyl, sulfinyl or sulfonyl;

(iii) n is an integer of 0 or 1;

(iv) p is 1 when n equals 1 and p is 1 or 0 when n equals 0, provided that when p is 1 the carbon content of the sum of both $R^5$ radicals does not exceed 14 carbon atoms;

(v) $R^4$ represents a hydrogen atom, or an alkyl radical having 1 to about 6 carbon atoms;

(vi) J represents a bivalent radical selected from sulfonyl or carbonyl;

(vii) q represents an integer of 0 or 1; and (viii) m represents an integer of 0, 1 or 2.

Especially good results are obtained in the above formula when D' is OH, j is 2, and Y is a naphthalene nucleus.

Examples of the ballasted carrier moiety in this highly preferred embodiment are disclosed in U.S. Published Patent Application No. B 351,673; U.S. Pat. No. 3,928,312; French Patent 2,284,140; and German Pat. Nos. 2,406,664; 2,613,005; and 2,505,248, the disclosures of which are hereby incorporated by reference, and include the following:

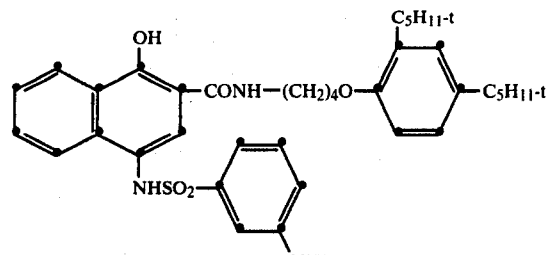

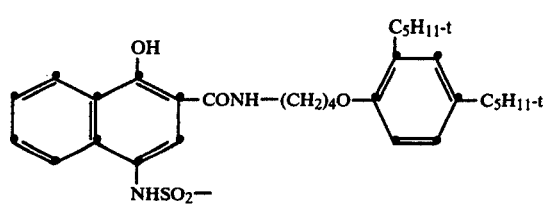

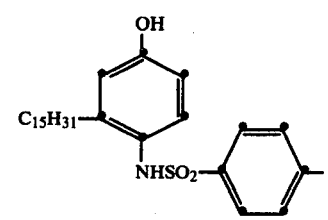

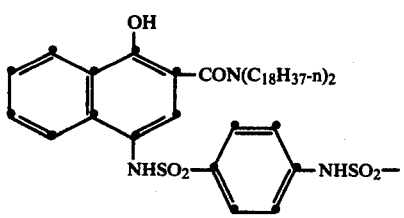

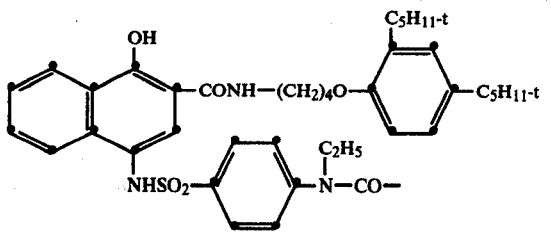

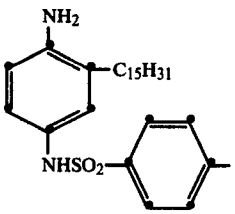

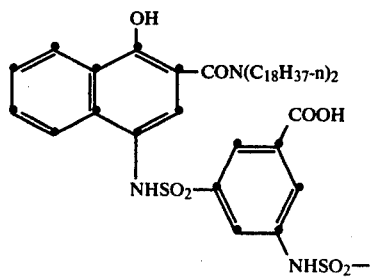

In other highly preferred embodiments of the invention, the ballasted carrier moiety is such that the diffusible azo dye is released as an inverse function of development of the silver halide emulsion layer under alkaline conditions. This is ordinarily referred to as positive-working dye-release chemistry. In one of these embodiments, the ballasted carrier moiety can be a group having the formula:

IV $$\text{Ballast} \overset{NO_2}{\underset{W2}{\diagup C \diagdown}} C - \overset{O}{\overset{\|}{C}} - \overset{R^7}{\underset{|}{N}} - [X' - (NR^4 - J)_q]_m -$$

wherein:

Ballast is an organic ballasting radical of such molecular size and configuration as to render the compound nondiffusible in a photographic element during development in an alkaline processing composition;

W² represents the atoms necessary to complete a benzene nucleus (including various substituents thereon);

R⁷ is an alkyl (including substituted alkyl) radical having 1 to about 4 carbon atoms;

X' is an alkylene group of 1 to 4 carbon atoms; and

R⁴, J, q and m are as defined above.

Examples of the ballasted carrier moiety of this formula include the following:

$$\text{Cl} - \underset{SO_2C_{18}H_{37}}{\overset{NO_2}{\diagdown}} - \overset{O}{\overset{\|}{C}} - \overset{C_2H_5}{\underset{|}{N}} - (CH_2)_2 NHCO -$$

In a second embodiment of positive-working dye-release chemistry, the ballasted carrier moiety can be a group having the formula:

V $$(\text{Ballast})_{\overline{k-1}} \overset{O}{\underset{W1}{\diagup C \diagdown}} C - (CH_2)_{r-1} - \overset{R^6}{\underset{|}{N}} - \overset{O}{\overset{\|}{C}} - O - [X'' - (NR^4 - J)_q]_m -$$

wherein:

Ballast is an organic ballasting radical of such molecular size and configuration as to render the compound nondiffusible in a photographic element during development in an alkaline processing composition;

W¹ represents the atoms necessary to complete a quinone nucleus (including various substituents thereon);

r is a positive integer of 1 or 2;

R⁶ is an alkyl (including substituted alkyl) radical having 1 to about 40 carbon atoms or an aryl (including substituted aryl) radical having 6 to about 40 carbon atoms;

k is a positive integer of 1 and 2 and is 2 when R⁶ is a radical of less than 8 carbon atoms;

X" is a phenylene or substituted phenylene radical of 6 to 9 carbon atoms; and

R⁴, J, q and m are as defined above.

Examples of the ballasted carrier of this formula include the following:

$$C_{12}H_{25}SO_2 - \underset{SO_2C_{12}H_{25}}{\overset{NO_2}{\diagdown}} - \overset{O}{\overset{\|}{C}} - \overset{CH_3}{\underset{|}{N}} - (CH_2)_3 - NHSO_2 -$$

For further details concerning the positive working ballasted carrier moieties of the two preceding general formulae, including synthesis details, reference is made to U.S. application Ser. No. 775,025 of Chasman et al, filed Mar. 7, 1977, the disclosure of which is hereby incorporated by reference.

In a third embodiment of positive-working dye release chemistry, the ballasted carrier moiety can be a group having the formula:

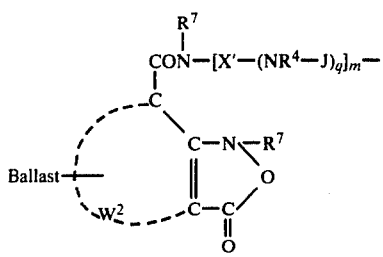

wherein:

Ballast, $W^2$, $R^7$, $X'$, $R^4$, J, q and m are as defined above.

Examples of the ballasted carrier moiety of this formula include the following:

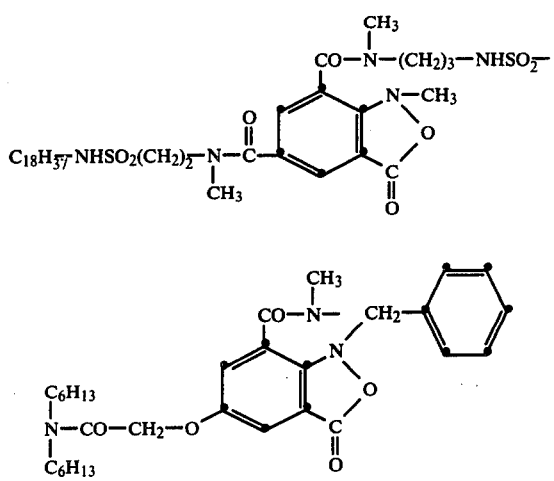

For further details concerning this ballasted carrier moiety, including synthesis details, reference is made to U.S. application Ser. No. 534,966 of Hinshaw et al, filed Dec. 20, 1974, the disclosure of which is hereby incorporated by reference.

In a fourth embodiment of positive-working dye release chemistry as referred to above, the ballasted carrier moiety can be a group having the formula:

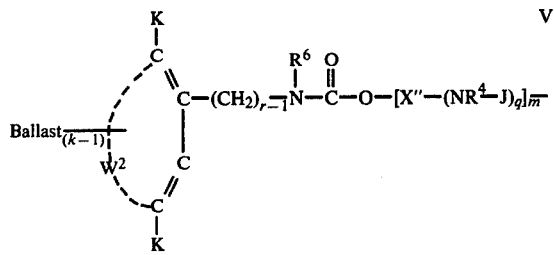

wherein:

Ballast, $W^2$, r, $R^6$, k, $X''$, $R^7$, J, q and m are as defined above; and

K is OH or a hydrolyzable precursor thereof.

Examples of the ballasted carrier moiety of this formula include the following:

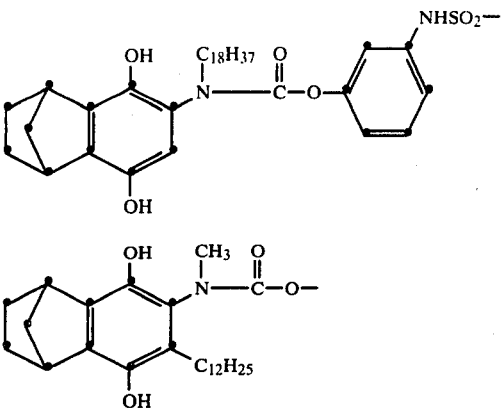

For further details concerning this ballasted carrier moiety, including synthesis details, reference is made to U.S. Pat. No. 3,980,479 of Fields et al, issued Sept. 14, 1976, the disclosure of which is hereby incorporated by reference.

Preferred nondiffusible compounds of our invention can be represented by the formula:

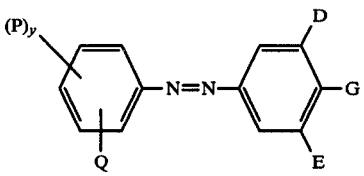

wherein:

G is hydroxy or a hydrolyzable ester group having the formula

where each $R^1$ is independently alkyl of 1 to 8 carbon atoms, aryl of 6 to 12 carbon atoms or a group which together with the

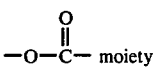  moiety is the ballasted carrier moiety;

D is an electron withdrawing group selected from halogen, nitro, cyano, lower perfluoroalkyl, —$SO_2R^8$, —$SO_2N(R^9)_2$ or —$COOR^9$;

E is a strong electron withdrawing group selected from nitro, cyano, lower perfluoroalkyl, —$SO_2R^8$, —$SO_2N(R^9)_2$ or —$COOR^9$;

P is —$COOR^9$, —$SO_2N(R^9)_2$ or —$CON(R^9)_2$;

y is an integer of 0 to 2;

$R_8$ is lower alkyl or lower aryl;

$R_9$ is, independently, hydrogen, lower alkyl, lower hydroxyalkyl, lower carboxyalkyl, lower aryl, or one of $R_9$ is a group which together with the

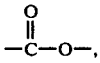

—$SO_2N$— or —CON— moiety to which it is attached is a ballasted carrier moiety; or both $R^9$ radicals form a 5- or 6-membered heterocyclic ring with the nitrogen atom to which they are attached;

Q is hydrogen, or a halogen, carboxy, lower alkyl or lower alkoxy substituent; and at least one of G, D, E or P contains the ballasted carrier moiety.

Particularly preferred are those compounds of formula VIII where:

G is hydroxy or a hydrolyzable ester having the formula $-OCOR^{10}$ where $R^{10}$ is alkyl of 1 to 8 carbon atoms or aryl of 6 to 12 carbon atoms;

D is an electron withdrawing group selected from halogen, cyano, or $-SO_2R^8$ where $R^8$ is as defined above;

E is a strong electron withdrawing group selected from nitro, cyano, $-SO_2R^8$, or $-SO_2N(R^{11})_2$, where $R^8$ is as defined above and each $R^{11}$ is independently hydrogen, lower alkyl, lower hydroxyalkyl or lower carboxyalkyl, or together both $R^{11}$ radicals form a 5- or 6-membered heterocyclic ring with the nitrogen atom to which they are attached;

Q is hydrogen, halogen, carboxy, lower alkyl or lower alkoxy;

P is the ballasted carrier moiety; and y is 1.

An especially preferred ballasted carrier moiety of the type represented by formula III, above, for use as P in formula VIII, above, can be represented by the structure:

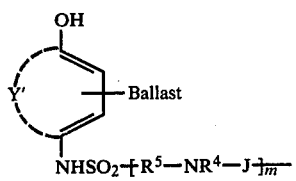

wherein:

Ballast is as previously defined;

Y' represents the atoms necessary to complete a benzene or naphthalene nucleus;

$R^5$ is an alkylene radical having 1 to about 8 carbon atoms, a phenylene radical, or a substituted phenylene radical having 6 to about 9 carbon atoms;

$R^4$ is a hydrogen atom or an alkyl group having 1 to about 6 carbon atoms;

J is sulfonyl; and m is 0 or 1.

Preferred azo dyes have the structure of formula VIII above, except that D, E and P do not contain a ballasted carrier moiety. Particularly preferred azo dyes have the structure:

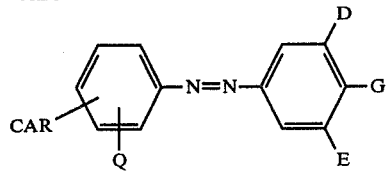

wherein:

G is hydroxy or a hydrolyzable ester having the formula $-OCOR^{10}$ where $R^{10}$ is as defined above;

D is an electron withdrawing group selected from halogen, cyano, or $-SO_2R^8$ where $R^8$ is as defined above;

E is a strong electron withdrawing group selected from nitro, cyano, $-SO_2R^8$, or $-SO_2N(R^{11})_2$, $R^8$ and $R^{11}$ are as defined above;

Q is hydrogen, halogen, carboxy, lower alkyl or lower alkoxy;

P is $-COOR^8$, $-SO_2N(R^{11})_2$ or $-CON(R^{11})_2$ where $R^8$ and $R^{11}$ are as defined above; and y is 1.

Especially preferred nondiffusible azo dye releasing compounds and azo dyes of this invention are shown in the following Tables I and II.

TABLE Ia

AZO DYE-RELEASING COMPOUNDS

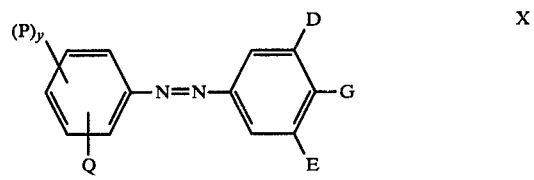

| Compound Number | CAR[2] | Attachment[1] | Q | D | E | G |
|---|---|---|---|---|---|---|
| 1 | A | 4 | H | Cl | $-NO_2$ | OH |
| 2 | A | 3 | H | Cl | $-CN$ | OH |
| 3 | B | 3 | H | Cl | $-NO_2$ | OH |
| 4 | B | 5 | 2-Cl | Cl | $-SO_2NHC_2H_5$ | OH |
| 5 | B | 3 | H | Cl | $-SO_2NHC(CH_3)_3$ | OH |
| 6 | B | 3 | H | Cl | $-SO_2NHCH_2COOC_2H_5$ | OH |
| 7 | B | 3 | H | Cl | $-SO_2NHCH_2COOH$ | OH |
| 8 | D | 3 | H | Cl | $-NO_2$ | OH |
| 9 | C[1] | 3 | H | Cl | $-NO_2$ | OH |
| 10 | B | 3 | H | Cl | $-SO_2NHC_2H_5$ | OH |
| 11 | E | 3,5 | H | Cl | $-NO_2$ | OCOPh |
| 12 | D | 4 | H | Cl | $-SO_2N\diagup\diagdown$ | OH |
| 13 | D | 3 | H | Cl | $-SO_2N(C_2H_5)_2$ | OH |
| 14 | C[2] | 4 | H | Cl | $-CN$ | OH |
| 15 | D | 5 | 2-OCH$_3$ | Cl | $-SO_2NHC(CH_3)_3$ | OH |
| 16 | D | 4 | H | Cl | $-SO_2NHCH_2CH_2OH$ | OH |
| 17 | B | 4 | H | Cl | $-SO_2NHCH(CH_3)_2$ | OCOCH$_3$ |
| 18 | F | 4 | H | Cl | $-SO_2NHCH_3$ | OCOCH$_3$ |

TABLE Ia-continued

AZO DYE-RELEASING COMPOUNDS

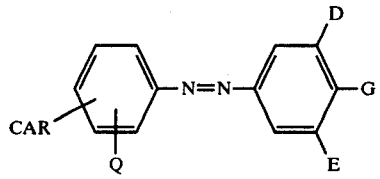

| Compound Number | CAR[2] | Attachment[1] | Q | D | E | G |
|---|---|---|---|---|---|---|
| 19 | G | 5 | 2-Cl | Cl | —SO$_2$NHCH$_3$ | OCOOCH$_2$C$_6$H$_5$ |
| 20 | C[3] | 3 | H | Cl | —SO$_2$NHCH(CH$_3$)$_2$ | OH |
| 21 | C[1] | 4 | H | —SO$_2$C$_6$H$_5$ | —SO$_2$C$_6$H$_5$ | OH |
| 22 | H | 3 | H | Cl | —CN | OH |

TABLE Ib

AZO DYE-RELEASING COMPOUNDS

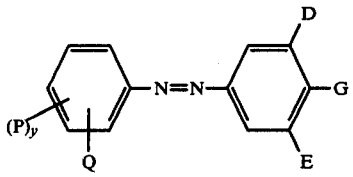

| Compound Number | CAR[2] | P | y | Q | E | D | G |
|---|---|---|---|---|---|---|---|
| 23 | J | SO$_2$CH$_3$ | 1 | H | —CAR | Cl | OH |
| 24 | K | SO$_2$CH$_3$ | 1 | H | —SO$_2$NHCH$_3$ | Cl | —CAR |

Footnote[1]
Position on the phenylazo group to which the carrier is attached.

Footnote[2]
The carriers are identified as follows: Carriers A, B and D have the general structure:

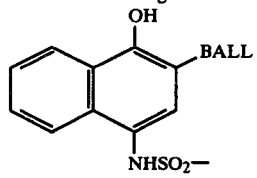

where BALL is identified as follows:

A: BALL = 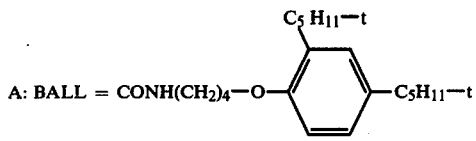

B: BALL = CON(C$_{12}$H$_{25}$—n)$_2$

D: BALL = 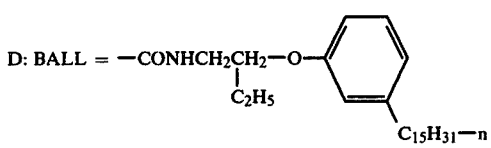

Carrier C has the general structure:

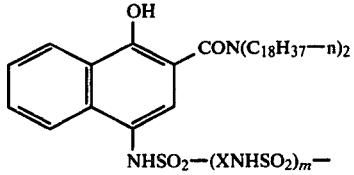

where X and m are defined as follows:
C[1]: m = 0

C[2]: m = 1; X = 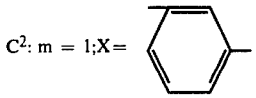

C³: m = 1; X = 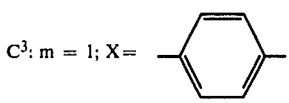

Carrier E has the structure:

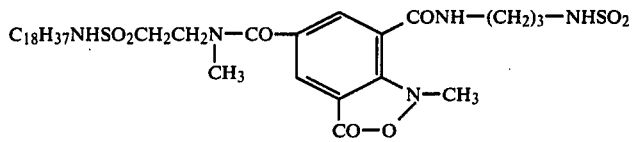

Carrier F has the structure:

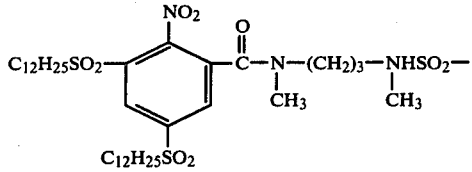

Carrier G has the structure:

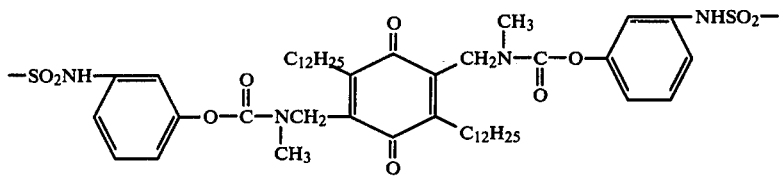

Two molecules of dye being attached per mole of the above carrier.

Carriers H and J have the structure:

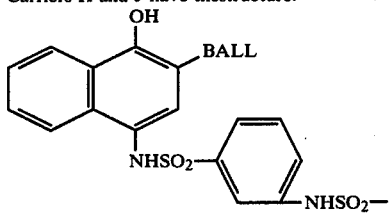

where BALL is:

H: $-CONH(CH_2)_4-O-$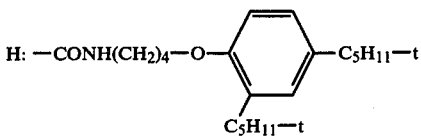

J: $-CON(C_{18}H_{37})_2$

Carrier K has the structure:

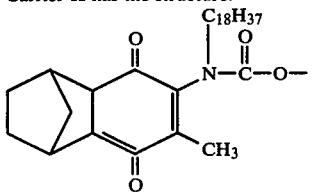

TABLE II

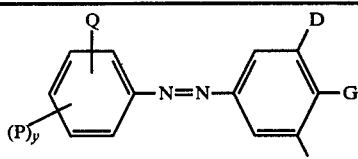

| Dye | P | y | Q | D | G | E |
|---|---|---|---|---|---|---|
| 1 | 5-SO₂NH₂ | 1 | 2-Cl | Cl | OCOCH₃ | CN |
| 2 | 4-SO₂NH₂ | 1 | 2-Cl | Cl | OH | SO₂NHC₂H₅ |
| 3 | 4-SO₂NH₂ | 1 | H | Cl | OH | SO₂C₂H₅ |
| 4 | 4-SO₂NH₂ | 1 | H | Cl | OH | SO₂CH₃ |
| 5 | 4-SO₂NH₂ | 1 | H | Cl | OH | SO₂NHC₂H₅ |
| 6 | 3,5-SO₂NH₂ | 2 | H | Cl | OH | SO₂NHC₂H₅ |
| 7 | 3-SO₂NHCOCH₃ | 1 | H | Cl | OH | CN |

TABLE II-continued

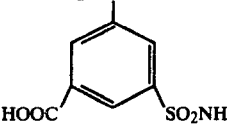

| Dye | P | y | Q | D | G | E |
|---|---|---|---|---|---|---|
| 8 | 4-SO$_2$NH$_2$ | 1 | H | SO$_2$CH$_3$ | OH | SO$_2$CH$_3$ |
| 9 | 4-SO$_2$NH$_2$ | 1 | H | COOH | OH | COOH |
| 10 | 3-COOCH$_3$ 5-SO$_2$NH$_2$ | 2 | H | Cl | OH | CN |
| 11 | 3-SO$_2$NH$_2$ 5-COOH | 2 | H | Cl | OH | CN |
| 12 | 4-SO$_2$NH$_2$ | 1 | H | CN | OH | CN |
| 13 | 5-SO$_2$—NH—(3-HOOC, 5-SO$_2$NH-phenyl) | 1 | 2-Cl | Cl | OH | SO$_2$NH(CH$_2$)$_2$NHSOCH$_3$ |

Dyes of this invention can be prepared by known techniques such as described in Fierz-David and Blangley, *Process of Dye Chemistry*, Intersciences Publishers, Inc., 1949.

A preferred procedure for preparing the 2-halo-6-sulfamoylphenol intermediates used to prepared the dyes in compounds such as numbers 2, 5, 6 and 13 is described in the copending application of our coworkers Stern and Lestina U.S. Patent application Ser. No. 850,178, filed Nov. 10, 1977, and entitled 2-Halo-6-Sulfamylphenols And A Process For Their Preparation.

Some of the dyes in which both D and E are strong electron-withdrawing groups cannot be made in the conventional manner, because the group deactivates the phenol so that it will not couple with diazonium salts. In these cases the azophenol is prepared by reacting the appropriate arylazomalonaldehyde derivative (Chem. Ber. 97, 96–109, 1964) with the appropriate 1,3-disubstituted acetone. For example,

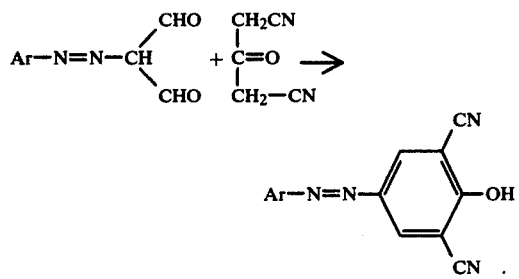

The non-diffusible azo dye-releasing compounds of this invention can be prepared by reacting an appropriate derivative of the dye with an appropriate derivative of the desired carrier by procedures described in the patents and applications referred to above showing specific classes of carriers.

Photographic color images can be prepared with elements of this invention by treating the element to form an imagewise distribution of diffusible azo dye as a function of the imagewise exposure of the silver halide emulsion. Images can be formed employing the imagewise released diffusible dye, or the remaining imagewise distribution of nondiffusible compound, or both. The released diffusible dye can be allowed to diffuse to a receiver sheet or layer to form a transfer image. Alternatively, it can merely be removed from the element and not made further use of. Whether the imagewise pattern of diffusible dye is used to form an image or not, the remaining nondiffusible compound can be used as a retained image in the layer in which it was initially coated. This could include removing residual silver and silver halide by any conventional procedure known to those skilled in the art, such as a bleach bath followed by a fix bath, a bleach-fix bath, etc. In the event that the azo dye in the nondiffusible compound is a shifted dye, the process for forming a retained image would include the step of converting it to the desired dye, for example, by hydrolysis. Alternatively, once the initially formed diffusible dye is removed from the element, the residual nondiffusible compound can be employed to form a transfer image by oxidizing it (e.g. by cross oxidation, or otherwise) to yield a second distribution of diffusible dye which can be transferred to a suitable receiver sheet or layer.

A process for producing a photographic image in color according to our invention comprises:

(a) treating an imagewise-exposed photographic element as described above with an alkaline processing composition in the presence of a silver halide developing agent to effect development of each of the exposed silver halide emulsion layers, (b) the dye-releasing compound then releasing the diffusible azo dye as described above imagewise as a function of the development of each of the silver halide emulsion layers; and (c) at least a portion of the imagewise distribution of the azo dye diffusing out of the layer in which it is coated.

In a preferred embodiment of our invention, a process for producing a photographic transfer image in color according to our invention comprises:

(a) treating an imagewise-exposed photographic element as described above wherein the ballasted carrier moiety has the formula:

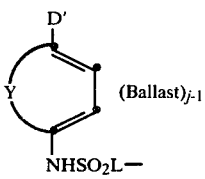

D', Y, L and j being defined as above;
with an alkaline processing composition in the presence of a silver halide developing agent to effect development of each of the exposed silver halide emulsion layers, thereby oxidizing the developing agent;

(b) the oxidized developing agent thereby cross-oxidizing the dye-releasing compound;

(c) the cross-oxidized dye-releasing compound then cleaving as a result of alkaline hydrolysis to release the diffusible azo dye imagewise as a function of the imagewise exposure of each of the silver halide emulsion layers; and (d) at least a portion of the imagewise distribution of the azo dye diffusing to a dye image-receiving layer.

After processing the photographic element described above, there remains in it after transfer has taken place an imagewise distribution of azo dye in addition to developed silver. A color image comprising residual nondiffusible compound may be obtained in this element if the residual silver and silver halide are removed by any conventional manner well known to those skilled in the photographic art, such as bleach bath followed by a fix bath, a bleach-fix bath, etc. The imagewise distribution of azo dye may also diffuse out of the element into these baths, if desired, rather than to an image-receiving element.

The photographic element in the above-described process can be treated with an alkaline processing composition to effect or initiate development in any manner. A preferred method for applying processing composition is by use of a rupturable container or pod which contains the composition. In general, the processing composition employed in this invention contains the development agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for in-camera processing, and comprises:

(1) a photographic element as described above;
(2) a dye image-receiving layer; and
(3) means for discharging an alkaline processing composition within the film unit, such as a rupturable container which is adapted to be positioned during processing of the film unit so that a compressive force applied to the container by the pressure-applying members will effect a discharge of the container's contents within the film unit;

the film unit containing a silver halide developing agent.

The dye image-receiving layer in the above-described film unit can be located on a separate support adapted to be superposed on the photographic element after exposure thereof. Such image-receiving elements are generally disclosed, for example, in U.S. Pat. No. 3,362,819.

When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, light-reading imge which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

The film unit or assembly used in the present invention may be used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive, i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith, the yellow dye-releasers being a compound in accordance with the present invention. The dye-releaser associated with each silver halide emulsion layer may be contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc., which is adapted to be permeated by aqueous alkaline processing composition.

Depending upon which ballasted carrier moiety is used in the present invention, a variety of silver halide developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:
  N-methylaminophenol
  Phenidone (1-phenyl-3-pyrazolidone)
  Dimezone (1-phenyl-4,4-dimethyl-3-pyrazolidone)
  aminophenols
  1-phenyl-4-methyl-4-hydroxymethyl-3-pyrazolidone
  N,N-diethyl-p-phenylenediamine
  N,N,N',N'-tetramethyl-p-phenylenediamine
  3-methyl-N,N-diethyl-p-phenylenediamine
  3-methoxy-N-ethyl-N-ethoxy-p-phenylenediamine, etc.

The non-chromogenic developers in this list are preferred, however, since they avoid any propensity of staining the dye image-receiving layer.

In one of the preferred embodiments of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferrable in alkaline processing composition either by virtue of its self-diffusivity or by having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions may be employed. If the silver halide emulsion employed is a direct-positive silver halide emulsion, such as an internal-image emulsion designed for use in the internal image reversal process or a fogged, direct-positive emulsion such as a solarizing emulsion. which is developable in unexposed areas, a positive image will be obtained on the dye image-receiving layer in those embodiments in which dye is released as a direct function of development. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material can be employed as the image-receiving layer in this invention as long as the desired function of mordanting or otherwise fixing the dye images will be obtained. The particular material chosen will, of course, depend upon the dye to be mordanted. Suitable materials are disclosed on pages 80 through 82 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure* and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably processing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" used herein has the meaning commonly applied to the term in photography and denotes materials that for all practical purposes do not migrate nor wander through organic colloid layers such as gelatin in an alkaline medium, in the photographic elements of the invention and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium in the presence of "nondiffusing" materials. "Mobile" has the same meaning.

The term "associated therewith" as used herein is intended to mean that the materials can be in either the same or different layers so long as the materials are accessible to one another.

The following examples further illustrate this invention.

EXAMPLE 1

Synthesis of Compound 1 (Table 1)

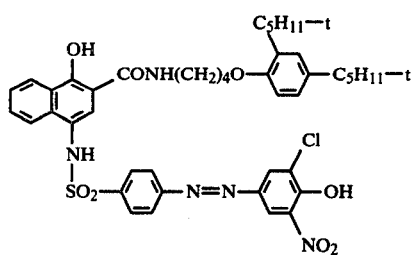

To a slurry of 3.0 g ground sodium carbonate in 25 ml dry dimethyl sulfoxide, under nitrogen, was added 2-chloro-4-(4-fluorosulfonyl-phenylazo)-6-nitrophenol (1.80 g, 5 mmol) followed by the addition of 4-amino-N-[4-di-t-pentylphenoxy)butyl]-1-hydroxy-2-naphthamide (2.55 g, 5.2 mmol). The reaction mixture was heated to 90° C. After 2 hours an additional 3.0 g ground sodium carbonate was added and the reaction mixture stirred at 90° C. overnight. After cooling to room temperature, the reaction mixture was poured over ice and hydrochloric acid resulting in a green precipitate, which was filtered off, washed with water, and then air dried. This material was dissolved in 80 ml tetrahydrofuran, slurried with anhydrous magnesium sulfate, the suspension filtered, and the filtrate poured into 800 ml hexane. The resulting precipitate was filtered off, washed with hexane, and air dried. The yield was 2.73 g (66%).

The dye was purified by column chromatography from 70 ml chloroform on silica gel. Elution with 10% hexane in chloroform removed a first component, whereupon elution with chloroform gave the purified product, m.p. 148°–50° C., $\epsilon = 3.22 \times 10^4$.

Preparation of Intermediates

4-Amino-N-[4-(2,4-di-t-pentylphenoxy)-butyl]-1-hydroxy-2-naphthamide

1-Hydroxy-N-[4-(2,4-di-t-pentylphenoxy)-butyl]-2-naphthamide was coupled with a diazotized p-anisidine

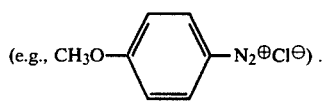

The azo group of the compound thus prepared was then reduced with sodium dithionite ($Na_2S_2O_4$) to the corresponding amine.

2-Chloro-4-(4-fluorosulfonylphenylazo)-6-nitrophenol

Solid 2-Chloro-4-(4-fluorosulfonylphenylazo)phenol (7.5 g. 23 mmol) was added rapidly to a vigorously stirred mixture of 15 ml concentrated nitric acid and 15 ml concentrated sulfuric acid, cooled to −30° C. After 13 minutes of stirring, the reaction mixture was poured into 400 ml ice water with vigorous stirring. The resulting precipitate was filtered off and washed with water. During drying on the funnel the solid softened and became tarry. When the tar was dissolved in acetic acid and then carefully and slowly diluted with water, a fine precipitate separated and was filtered off. This process was repeated with the filtrate until the resulting precipitate no longer separated as a solid. The collected solids were combined and air dried. Yield: 3.1 g, (37%) m.p. 129°–133° C.

2-Chloro-4-(4-fluorosulfonylphenylazo)phenol

Sulfanilyl fluoride (17.5 g, 0.1 mole) was dissolved in 75 ml warm saturated methanolic HCl, and the resulting solution was cooled in a methanol-ice bath. Sodium nitrite (7.0 g, 0.1 mole), dissolved in 25 ml water was then added dropwise, and the solution stirred 5 minutes more. The diazonium salt solution was then added dropwise to a cold (cooled in an ice bath) solution of o-chlorophenol (12.8 g, 0.099 mole) dissolved in 150 ml pyridine. The reaction mixture was stirred an additional 15 minutes and then poured over ice and hydrochloric acid. The resulting precipitate was filtered off, washed with water, and air dried. The yield was 20.0 g (64%), m.p. 133°–134° C.

EXAMPLE 2

Synthesis of Compound 2 (Table I)

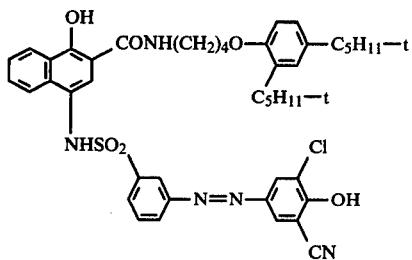

This compound was prepared from 2-chloro-6-cyano-4-(3-fluorosulfonylphenylazo)phenyl acetate by the method of Example 1. The crude brown product was purified by column chromatography. It was added to a silica gel column in chloroform, the components separated with 5% acetone in chloroform and the purified dye eluted with acetone. The yield, after evaporation of the solvent was 17%, m.p. 183°–186° C. $\epsilon = 3.1 \times 10^4$.

Preparation of Intermediates

2-Chloro-6-cyano-4-(3-fluorosulfonylphenylazo)phenyl acetate

3-Chloro-5-(3-fluorosulfonylphenylazo)-2-hydroxybenzaldehyde oxime (22.5 g, 0.063 mol) was added to 150 ml acetic anhydride and heated to 95° C. Sodium acetate (3.0 g) was added. After 2½ hours, the reaction mixture was poured into 750 ml water and stirred at room temperature until anhydride fully hydrolysed. The resulting precipitate was filtered off. The solids which became gummy on standing were dissolved in 75 ml chloroform and poured onto a silica gel column. Elution with 10% hexane in chloroform gave the desired dye as the first component. Removal of the solvents under reduced pressure gave an oil which hardened on standing but did not crystallize. Yield: 16.8 g (70%).

3-Chloro-5-(3-fluorosulfonylphenylazo)-2-hydroxybenzaldehyde oxime

3-Chloro-5-(3-fluorosulfonylphenylazo)-2-hydroxybenzaldehyde (23.8 g, 0.07 mol) was added to 250 ml ethanol, followed by hyroxylamine hydrochloride (5.04 g, 0.072 mol) and sodium hydroxide (2.88 g, 0.072 mol). The reaction was brought to reflux for 30 minutes and then cooled to room temperature. The mixture was then poured into ice and hydrochloric acid, resulting in the formation of a precipitate which was filtered off, washed with water, and dried in a vacuum oven (55° C.). The yield was 22.5 g (90%).

3-Chloro-5-(3-fluorosulfonylphenylazo)-2-hydroxy benzaldehyde m-Aminobenzenesulfonyl fluoride hydrochloride (21.1 g, 0.099 mol) was slurried in hot 10% HCl (300 ml) and then cooled to 0° C. Sodium nitrite (7.0 g, 0.1 mol) was dissolved in 30 ml water and added dropwise to the acidic solution. Vigorous stirring was required to prevent the slurry from coagulating. The diazonium slurry was then added slowly to 500 ml of pyridine containing 3-chloro-2-hydroxy-benzaldehyde (16.0 g, 0.10 mol) at 0° C. The mixture was stirred 30 minutes and then slowly added to 1500 ml ice and hydrochloric acid. The resulting precipitate coagulated into one lump. The liquid was decanted off and the remaining tarry solid crushed and slurried in 50% HCl. The resulting solid was filtered off, washed with water and air dried, (21.1 g). Upon standing 72 hours, the decanted solution yielded an additional 2.8 g. Yield: 23.8 g (70%).

m-Aminobenzenesulfonyl fluoride hydrochloride m-Nitrobenzenesulfonyl fluoride (41.0 g, 0.20 mol) was dissolved in 200 ml dr tetrahydrofuran, Pd/carbon catalyst added, and the mixture was shaken under hydrogen for 6 hours at room temperature. The solution was filtered and the solvent removed under reduced pressure, resulting in an oil. The oil was dissolved in benzene into which dry halogen chloride gas was bubbled. The resulting precipitate was filtered off, washed with additional benzene and dried in a vacuum oven (55° C.). The yield was 42.1 g (100%), m.p. 198°–199° C.

3-Chloro-2-hydroxybenzaldehyde

A sodium hydroxide solution (266 g, 6.65 mol in 1000 ml water) in a 3000 ml round bottom flask, equipped with a mechanical stirrer, addition funnel (250 ml), and a reflux condenser was warmed to 60° C. o-Chlorophenol (126 g, 0.98 mol) was added, dissolving instantly. Chloroform (262 g, 2.20 mol) was then introduced slowly over a one-hour period. After stirring at 60° C. for an additional two hours, the temperature was raised to 80° C. for sixteen hours. The excess chloroform was then allowed to distill off, the reaction acidified with 6 N sulfuric acid, and the mixture steam distilled. Six liters of distillate were extracted with ether, the ethereal solution dried with MgSO4, the slurry filtered, and the solvent evaporated under reduced pressure. A yellow oil composed of both the desired product and 3-chloro-4-hydroxybenzaldehyde remained. Pouring the oil into 500 ml of vigorously stirred hexane generated a white precipitate of 3-chloro-4-hydroxybenzaldehyde which was filtered off. Yield: 8%. The hexane filtrate was evaporated under reduced pressure yielding an oil which crystallized upon standing at room temperature for 24 hours. The yield of 3-chloro-2-hydroxybenzaldehyde was 8.01 g (5%), m.p. 51°–53° C.

EXAMPLE 3

Dyes released from compounds of Table I and dyes of Table II were tested for absorption and light stability.

Each dye was incorporated in a viscous solution, the composition of which was per liter: $5 \times 10^{-3}$ moles dye, 20 g sodium hydroxide (0.5 M) and 30 g hydroxyethylcellulose. The solution was spread between a polyester film cover sheet and a receiving element containing a mixture of gelatin and a mordant, poly[styrene-co-N-vinylbenzyl-N-benzyl-N,N-dimethylammonium sulfate-co-divinylbenzene], each at 2.2 g/m², the mixture coated as a latex on a polyester support.

The sandwich formed by the cover sheet, the viscous dye solution and the receiving element was passed between a pair of juxtaposed pressure rollers set so that the viscous dye solution was 0.1, 0.2 and 0.4 μm thick on separate samples. After a 2-minute transfer time, the laminate was peeled apart and the receiving element washed and dried. Actual surface pH measurements have shown the final pH to be about 8. The three samples of the receiving element offer a choice of 3 densities, one of which was selected for spectra and fading tests.

Table III shows absorption and light stability data for the dyes released from the compounds of Table I, and Table IV shows the same data for the dyes of Table II. In Table III, Z represents the portion of the carrier remaining on the dye after release.

The hue of the dye is represented by the wavelength of maximum optical density ($\lambda_{max}$) of the absorption spectrum and the "half band width" (½ B.W.) which is the width of the spectrum band at one-half of the density of the peak at $\lambda_{max}$.

Light stability was determined by exposure to a "simulated average northern skylight" test for 21 days: a high intensity 6000 w xenon arc lamp unit irradiating the sample with 5280 lux at 21° C. and 45% relative humidity. The optical density was measured at $\lambda_{max}$ both before ($D_o$) and after (D) exposure.

TABLE III

| Dye From Cpd. No. | Residue of CAR | Absorption λmax (nm) | ½ BW (nm) | Light Stability $D_o$ | D | D Loss |
|---|---|---|---|---|---|---|
| 1 | 4-SO₂NH₂ | 424 | 118 | 1.06 | 0.86 | 0.20 |
| 2 | 3-SO₂NHCOCH₃ | 440 | 143* | 1.55 | 1.51 | 0.04 |
| 3,8,9 | 3-SO₂NH₂ | 418 | 117 | 0.93 | 0.81 | 0.12 |
| 4 | 5-SO₂NH₂ | 446 | 109 | 1.48 | 1.36 | 0.12 |
| 6 | 3-SO₂NH₂ | 437 | 100 | 1.73 | 1.51 | 0.22 |
| 7 | 3-SO₂NH₂ | 439 | 107 | 1.51 | 1.34 | 0.17 |
| 11 | 3,5-[-SO₂NH(CH₂)₃-SO₂NH₂]₂ | 442 | 116 | 1.88 | 1.48 | 0.40 |
| 12 | 4-SO₂NH₂ | 461 | 101 | 1.22 | 1.13 | .09 |
| 13 | 3-SO₂NH₂ | 454 | 95 | 1.86 | 1.73 | .13 |
| 14 | 4-SO₂NH—mC₆H₄-SO₂NH₂ | 441 | >150** | 1.31 | 1.24 | .07 |
| 15 | 5-SO₂NH₂ | 443 | 109 | 1.70 | 1.59 | .11 |

TABLE III-continued

| Dye From Cpd. No. | Residue of CAR | Absorption λmax (nm) | ½ BW (nm) | Light Stability D₀ | D | D Loss |
|---|---|---|---|---|---|---|
| 21 | 4-SO₂NH₂ | 420 | 145** | 1.85 | 1.62 | .23 |

*There is a secondary absorption peak in ultraviolet which does not affect the visible color but does extend ½ B.W.
**Estimated by extrapolation of a portion of the absorption curve below 400 nm which was off the scale.

TABLE IV

| Dye No. | Absorption (Unblocked Dye) max (nm) | ½ BW | Light Stability D₀ | D | Density Loss |
|---|---|---|---|---|---|
| 1 | 452 | 109 | 1.52 | 1.17 | 0.35 |
| 2 | 456 | 116 | 0.86 | 0.78 | 0.08 |
| 3 | 446 | 103 | 0.95 | 0.84 | 0.11 |
| 4 | 438 | 100 | 1.33 | 1.28 | 0.05 |
| 5 | 444 | 107 | 1.02 | 0.93 | 0.09 |
| 6 | 447 | 105 | 0.86 | 0.79 | 0.07 |
| 7 | (See Table III, Dye from Compound No. 2) | | | | |
| 8 | 418 | >150* | 2.00 | 1.71 | .29 |
| 9 | 386 | 110* | 1.97 | 1.74 | .23 |
| 11 | 440 | 101 | 1.62 | 1.52 | .10 |
| 12 | 383 | >150* | 1.76 | 1.56 | .20 |
| 13 | 440 | 108 | 1.23 | 1.06 | .17 |

*Estimated by extrapolation of a portion of the absorption curve below 400 nm which was off the scale.

EXAMPLE 4

An integral multicolor photosensitive element was prepared by coating the following layers in the order recited on a transparent poly(ethylene terephthalate) film support. Coverages are shown in parentheses and are in g/m² unless specified otherwise:

1. image-receiving layer of a latex of poly[styrene-co-N-vinylbenzyl-N-benzyl-N-benzyl-N,N-dimethylammonium sulfate-co-divinylbenzene] (2.2) and gelatin (1.1);

2. reflecting layer of titanium dioxide (16) and gelatin (2.6);

3. opaque layer of carbon black (1.9) and gelatin (3.3);

4. cyan dye-releasing compound (0.59) having the formula:

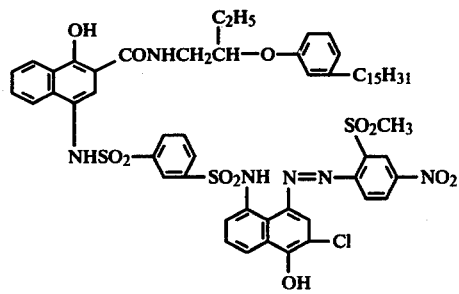

and gelatin (1.1);

5. red-sensitive, direct positive internal-image gelatin-silver bromide emulsion (1.3 silver; 1.3 gelatin), potassium 2-octadecylhydroquinone-5-sulfonate (16 g/mole silver) and nucleating agent 1-p-formylhydrazinophenyl-3-phenyl-2-thiourea (3.8 mg/mole silver);

6. interlayer of gelatin (1.6) and 2,5-di-sec-dodecylhydroquinone (1.3);

7. magenta dye-releasing compound (0.54) having the formula:

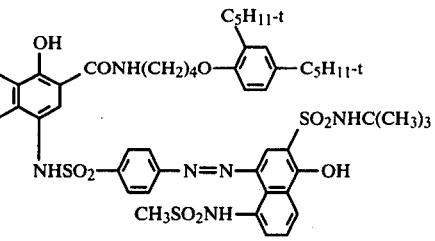

and gelatin (1.2);

8. green-sensitive, direct positive internal-image gelatin-silver bromide emulsion (1.25 silver, 1.3 gelatin), potassium 2-octadecylhydroquinone-5-sulfonate (16 g/mole silver) and nucleating agents 1-acetyl-2{4-[5-amino-2-(2,4-di-t-pentylphenoxy)benzamido]phenyl}-hydrazine and 1-formylhydrazinophenyl-3-phenyl-2-thiourea (34 mg and 2.7 mg/mole silver, respectively);

9. interlayer of gelatin (1.6) and 2,5-di-sec-dodecylhydroquinone (1.3);

10. yellow dye-releasing compound 22 (0.65) having the formula:

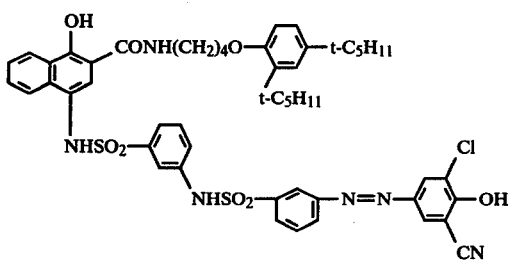

and gelatin (1.45);

11. blue-sensitive internal-image gelatin-silver bromide emulsion (1.25 silver, 1.3 gelatin), potassium 2-octadecylhydroquinone-2-sulfonate (16 g/mole silver) and nucleating agents 1-acetyl-2-{4-[5-amino-2-(2,4-di-t-pentylphenoxy)benzamido]phenyl}hydrazine and 1-p-formylhydrazinophenyl-3-phenyl-2-thiourea (24 mg and 2.7 mg/mole silver, respectively);

12. overcoat of gelatin (0.9) and 2,5-didoceylhydroquinone (0.11).

The above photosensitive element was then exposed to a tungsten light source through a graduated-density multicolor test object. A processing composition in a pod is spread between each photosensitive element and a processing cover sheet by passing the transfer "sandwich" between a pair of juxtaposed pressure rollers. The sample was maintained at 23° C. during processing. The processing composition and the cover sheet are described in Example 2 of Ducharme and Hannie, U.S. Ser. No. 676,947, filed Apr. 14, 1976.

After about 3 hours sensitometric curves were obtained by reflection densitometry with the following results:

| Maximum Density | | | Minimum Density | | |
|---|---|---|---|---|---|
| Red | Green | Blue | Red | Green | Blue |
| 2.10 | 2.16 | 2.27 | 0.20 | 0.24 | 0.30 |

This invention has been described in detail with particular reference to preferred embodiments thereof, but it will be understood that variations and modifications can be effected within the spirit and scope of the invention.

What is claimed is:

1. A photographic element comprising a support having thereon at least one photosensitive silver halide emulsion layer, said emulsion layer having associated therewith a nondiffusible compound having a releasable yellow azophenol dye moiety which is diffusible under alkaline conditions when released from the compound, said compound having the formula:

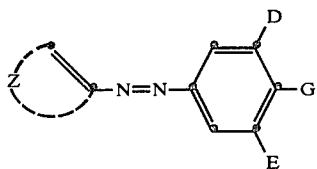

wherein:
D is an electron withdrawing group having a Hammett para sigma value greater than 0;
E is a strong electron withdrawing group having a Hammett para sigma value greater than +0.3;
G is hydroxy or a hydrolyzable precursor thereof;
Z represents the atoms necessary to complete an aromatic carbocyclic or heterocyclic nucleus having at least one ring of 5 to 7 atoms;
and, attached to one of the rings, a ballasted carrier moiety capable of releasing said diffusible yellow azophenol dye under alkaline conditions as a function of development of said silver halide emulsion layer.

2. The photographic element of claim 1 wherein Z represents the atoms necessary to complete a phenyl group.

3. The photographic element of claim 2 wherein the phenyl group represented by Z contains one or more halogen, lower alkyl, lower alkoxy, acid or acid derivative substituents.

4. The photographic element of claim 1 wherein D is an electron withdrawing group selected from halogen, nitro, cyano, carboxy, sulfonyl, sulfamoyl, or lower perfluoroalkyl; and E is a strong electron withdrawing group selected from nitro, cyano, carboxy, sulfonyl, sulfamoyl or lower perfluoroalkyl.

5. The photographic element of claim 1 wherein G is hydroxy or a hydrolyzable ester group having the formula $$-\overset{O}{\overset{\|}{C}}R^1, -\overset{O}{\overset{\|}{C}}OR^1 \text{ or } -O-\overset{O}{\overset{\|}{C}}N(R^1)_2$$

where $R^1$ is hydrogen, alkyl of 1 to 8 carbon atoms, aryl of 6 to 12 carbon atoms or a group which together with the $$-O-\overset{O}{\overset{\|}{C}}- \text{ moiety}$$

is the ballasted carrier moiety.

6. The photographic element of claim 1 wherein said ballasted carrier moiety is a group having the formula:

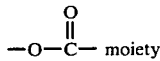

wherein:
BALL is an organic ballasting radical of such molecular size and configuration as to render said compound nondiffusible in said photographic element during development in an alkaline processing composition;
CAR is an oxidizable acyclic, carbocyclic or heterocyclic moiety; and
LINK represents a group which upon oxidation of said carrier moiety is capable of being hydrolytically cleaved to release said diffusible azo dye.

7. The photographic element of claim 1 wherein the ballasted carrier moiety is a group having the formula:

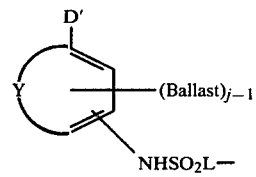

wherein:
(a) Ballast is an organic ballasting radical of such molecular size and configuration as to render said compound nondiffusible in said photographic element during development in an alkaline processing composition;
(b) D' is $OR^2$ or $NHR^3$ wherein $R^2$ is hydrogen or a hydrolyzable moiety and $R^3$ is hydrogen or a substituted or unsubstituted alkyl group of 1 to 22 carbon atoms;
(c) —NHSO$_2$L— is ortho or para to D';
(d) Y represents the atoms necessary to complete a benzene nucleus, a naphthalene nucleus, or a one or two ringed heterocyclic ring system containing 5 to 7 members in each ring;
(e) j is a positive integer of 1 to 2 and is 2 when D' is $OR^2$ or when $R^3$ is hydrogen or an alkyl group of less than 8 carbon atoms; and
(f) L is a linking group represented by —[X—(N-R$^4$—J)$_q$]$_m$— or —X—J—NR$^4$— wherein:
  (i) X represents a bivalent linking group of the formula —R$^5$—L'$_n$—R$^5_p$— where each $R^5$ can be the same or different and each represents an alkylene radical having 1 to about 8 carbon atoms; a phenylene radical; or a substituted phenylene radical having 6 to about 9 carbon atoms;
  (ii) L' represents a bivalent radical selected from oxy, carbonyl, carboxamido, carbamoyl, sulfonamido, ureylene, sulfamoyl, sulfinyl or sulfonyl;
  (iii) n is an integer of 0 or 1;
  (iv) p is 1 when n equals 1 and p is 1 or 0 when n equals 0, provided that when p is 1 the carbon content of the sum of both $R^5$ radicals does not exceed 14 carbon atoms;
  (v) $R^4$ represents a hydrogen atom, or an alkyl radical having 1 to about 6 carbon atoms;
  (vi) J represents a bivalent radical selected from sulfonyl or carbonyl;
  (vii) q represents an integer of 0 or 1; and
  (viii) m represents an integer of 0, 1 or 2.

8. The photographic element of claim 7 wherein D' is OH, j is 2 and Y is a naphthalene nucleus.

9. A photographic element comprising a support having thereon at least one photosensitive silver halide emulsion layer, said emulsion layer having associated therewith a nondiffusible compound having a releasable yellow azophenol dye moiety which is diffusible under alkaline conditions when released from the compound and a ballasted carrier moiety which is capable of releasing said yellow azophenol dye as a function of development of said silver halide emulsion layer under alkaline conditions, said compound having the formula:

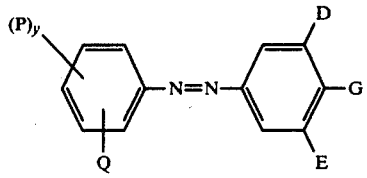

wherein:

G is hydroxy or a hydrolyzable ester group having the the formula

where each $R^1$ is independently alkyl of 1 to 8 carbon atoms, aryl of 6 to 12 carbon atoms or a group which together with the

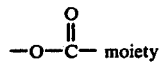

is the ballasted carrier moiety;

D is an electron withdrawing group selected from halogen, nitro, cyano, lower perfluoroalkyl, $-SO_2R^8$, $-SO_2N(R^9)_2$ or $-COOR^9$;

E is a strong electron withdrawing group selected from nitro, cyano, lower perfluoroalkyl, $-SO_2R^8$, $-SO_2N(R^9)_2$ or $-COOR^9$;

P is independently $-COOR^9$, $-SO_2N(R^9)_2$ or $-CON(R^9)_2$;

y is an integer of 0 to 2;

$R^8$ is lower alkyl or lower aryl;

$R^9$ is, independently, hydrogen, lower alkyl, lower hydroxyalkyl, lower carboxyalkyl, lower aryl, or one of $R^9$ is a group which together with the

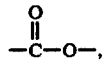

$-SO_2N-$ or $-CON-$ moiety to which it is attached is the ballasted carrier moiety; or both $R^9$ radicals form a 5- or 6-membered heterocyclic ring with the nitrogen atom to which they are attached;

Q is hydrogen, or a halogen, carboxy, lower alkyl or lower alkoxy substituent; and at least one of G, D, E or P contains the ballasted carrier moiety.

10. The photographic element of claim 9 wherein:

G is hydroxy or a hydrolyzable ester having the formula $-OCOR^{10}$ where $R^{10}$ is alkyl of 1 to 8 carbon atoms or aryl of 6 to 12 carbon atoms;

D is an electron withdrawing group selected from halogen, cyano or $-SO_2R^8$ where $R^8$ is lower alkyl or lower aryl;

E is a strong electron withdrawing group selected from nitro, cyano, $-SO_2R^8$ or $-SO_2N(R^{11})_2$, where $R^8$ is as defined above and each $R^{11}$ is independently hydrogen, lower alkyl, lower hydroxyalkyl or lower carboxyalkyl, or together both $R^{11}$ radicals form a 5- or 6-membered heterocyclic ring with the nitrogen atom to which they are attached;

Q is hydrogen, halogen, carboxy, lower alkyl or lower alkoxy;

P is the ballasted carrier moiety; and y is 1.

11. The photographic element of claim 10 wherein the ballasted carrier moiety represented by P has the structure:

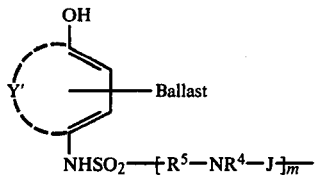

wherein:

Ballast is an organic ballasting radical of such molecular size and configuration as to render said compound nondiffusible in said photographic element during development in an alkaline processing composition;

Y' represents the atoms necessary to complete a benzene or naphthalene nucleus;

$R^5$ is an alkylene radical having 1 to about 8 carbon atoms, a phenylene radical, or a substituted phenylene radical having 6 to about 9 carbon atoms;

$R^4$ is a hydrogen atom or an alkyl group having 1 to about 6 carbon atoms;

J is sulfonyl; and m is 0 or 1.

12. A photographic element comprising a support having thereon at least one photosensitive silver halide emulsion layer, said emulsion layer having associated therewith a nondiffusible compound having a releasable yellow azophenol dye moiety which is diffusible under alkaline conditions when released from the compound and a ballasted carrier moiety which is capable of releasing said yellow azophenol dye as a function of development of said silver halide emulsion layer under alkaline conditions, said compound having the formula:

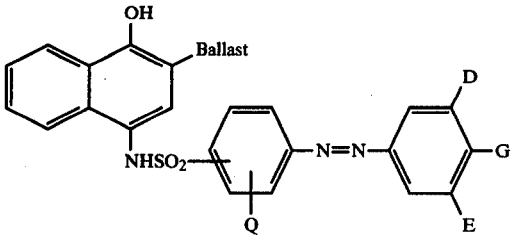

wherein:

Ballast is an organic ballasting radical of such molecular size and configuration as to render said compound nondiffusible in said photographic element during development in an alkaline processing composition;

G is hydroxy or a hydrolyzable ester having the formula $-OCOR^{10}$ where $R^{10}$ is alkyl of 1 to 8 carbon atoms or aryl of 6 to 12 carbon atoms;

D is halogen;

E is $-SO_2N(R^{11})_2$ where each $R^{11}$ is independently hydrogen, lower alkyl or lower hydroxyalkyl; and Q is hydrogen or halogen.

13. In a photographic assemblage comprising:
(a) a support having thereon at least one photosensitive silver halide emulsion layer having associated therewith a dye image-providing material;
(b) a dye image-receiving layer; and
(c) an alkaline processing composition and means for discharging same within said assemblage;
said assemblage containing a silver halide developing agent, the improvement wherein said dye image-providing material is a nondiffusible compound having a releasable yellow azophenol dye moiety which is diffusible under alkaline conditions when released from the compound, said compound having the following formula:

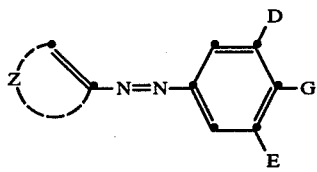

wherein:
D is an electron withdrawing group having a Hammett para sigma value greater than 0;
E is a strong electron withdrawing group having a Hammett para sigma value greater than +0.3;
G is hydroxy or a hydrolyzable precursor thereof;
Z represents the atoms necessary to complete an aromatic carbocyclic or heterocyclic nucleus having at least one ring of 5 to 7 atoms;
and, attached to one of the rings, a ballasted carrier moiety capable of releasing said diffusible yellow azophenol dye under alkaline conditions as a function of development of said silver halide emulsion layer.

14. The photographic assemblage of claim 13 wherein Z represents the atoms necessary to complete a phenyl group.

15. The photographic assemblage of claim 14 wherein the phenyl group represented by Z contains one or more halogen, lower alkyl, lower alkoxy, acid or acid derivatives substituents.

16. The photographic assemblage of claim 15 wherein G is hydroxy; or a hydrolyzable ester group having the formula

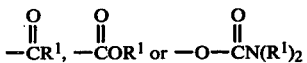

where $R^1$ is hydrogen, alkyl of 1 to 8 carbon atoms, aryl of 6 to 12 carbon atoms or a group which together with the

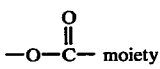

is the ballasted carrier moiety.

17. The photographic assemblage of claim 15 wherein said ballasted carrier moiety is a group having the formula:

(BALL-CAR-LINK)- wherein:
BALL is an organic ballasting radical of such molecular size and configuration as to render said compound nondiffusible in said photographic element during development in an alkaline processing composition;
CAR is an oxidizable acyclic, carbocyclic or heterocyclic moiety; and
LINK represents a group which upon oxidation of said carrier moiety is capable of being hydrolytically cleaved to release said diffusible azo dye.

18. The photographic assemblage of claim 15 wherein the ballasted carrier moiety is a group having the formula:

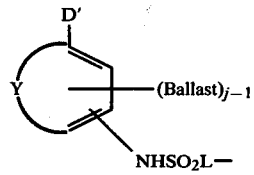

wherein:
(a) Ballast is an organic ballasting radical of such molecular size and configuration as to render said compound nondiffusible in said photographic element during development in an alkaline processing composition;
(b) D' is $OR^2$ or $NHR^3$ wherein $R^2$ is hydrogen or a hydrolyzable moiety and $R^3$ is hydrogen or a substituted or unsubstituted alkyl group of 1 to 22 carbon atoms;
(c) —NHSO$_2$L— is ortho or para to D';
(d) Y represents the atoms necessary to complete a benzene nucleus, a naphthalene nucleus, or a one or two ringed heterocyclic ring system containing 5 to 7 members in each ring;
(e) j is a positive integer of 1 to 2 and is 2 when D' is $OR^2$ or when $R^3$ is hydrogen or an alkyl group of less than 8 carbon atoms; and
(f) L is a linking group represented by —[X—(N-$R^4$—J)$_q$]$_m$— or —X—J—NR$^4$— wherein:
 (i) X represents a bivalent linking group of the formula —$R^5$—L'$_n$—$R^5_p$— where each $R^5$ can be the same or different and each represents an alkylene radical having 1 to about 8 carbon atoms; a phenylene radical; or a substituted phenylene radical having 6 to about 9 carbon atoms;
 (ii) L' represents a bivalent radical selected from oxy, carbonyl, carboxamido, carbamoyl, sulfonamido, ureylene, sulfamoyl, sulfinyl or sulfonyl;
 (iii) n is an integer of 0 or 1;
 (iv) p is 1 when n equals 1 and p is 1 or 0 when n equals 0, provided that when p is 1 the carbon content of the sum of both $R^5$ radicals does not exceed 14 carbon atoms;
 (v) $R^4$ represents a hydrogen atom, or an alkyl radical having 1 to about 6 carbon atoms;
 (vi) J represents a bivalent radical selected from sulfonyl or carbonyl;
 (vii) q represents an integer of 0 or 1; and
 (viii) m represents an integer of 0, 1 or 2.

19. The photographic assemblage of claim 18 wherein:
(a) said dye image-receiving layer is located between said support and said silver halide emulsion layer; and
(b) said assemblage also includes a transparent cover sheet over the layer outermost from said support.

20. The photographic assemblage of claim 19 wherein said cover sheet has thereon, in sequence, a neutralizing layer and a timing layer.

21. The photographic assemblage of claim 20 wherein said discharging means is a rupturable container containing said alkaline processing composition and an opacifying agent, said container being so positioned during processing of said assemblage that a compressive force applied to said container will effect a discharge of the container's contents between said transparent cover sheet and the layer outermost from said support.

22. The photographic assemblage of claim 18 wherein said support having thereon said photosensitive silver halide emulsion layer is opaque and said dye image-receiving layer is located on a separate transparent support superposed over the layer outermost from said opaque support.

23. The photographic assemblage of claim 22 wherein said transparent support has thereon, in sequence, a neutralizing layer, a timing layer, and said dye image-receiving layer.

24. In an integral photographic assemblage comprising:
(a) a photosensitive element comprising a transparent support having thereon the following layers in sequence: a dye image-receiving layer, an alkaline solution-permeable, light-reflective layer, an alkaline solution-permeable, opaque layer, a red-sensitive silver halide emulsion layer having a ballasted cyan dye releaser associated therewith, a green-sensitive silver halide emulsion layer having a ballasted magenta dye releaser associated therewith, and a blue-sensitive silver halide emulsion layer having a ballasted yellow dye releaser associated therewith;
(b) a transparent sheet superposed over said blue-sensitive silver halide emulsion layer and comprising a transparent support having thereon, in sequence, a neutralizing layer and a timing layer; and
(c) a rupturable container containing an alkaline processing composition and an opacifying agent which is so positioned during processing of said assemblage that a compressive force applied to said container will effect a discharge of the container's contents between said transparent sheet and said blue-sensitive silver halide emulsion layer; said assemblage containing a silver halide developing agent; the improvement wherein said ballasted yellow dye releaser is a nondiffusible compound having a releasable yellow azophenol dye moiety which is diffusible, under alkaline conditions, when released from said compound, said compound having the following formula:

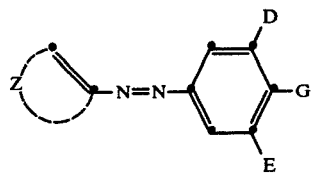

wherein:
D is an electron withdrawing group having a Hammett para sigma value greater than 0;
E is a strong electron withdrawing group having a Hammett para sigma value greater than +0.3;
G is hydroxy or a hydrolyzable precursor thereof;
Z represents the atoms necessary to complete an aromatic carbocyclic or heterocyclic nucleus having at least one ring of 5 to 7 atoms;
and, attached to one of the rings, a ballasted carrier moiety capable of releasing said diffusible yellow azophenol dye under alkaline conditions as a function of development of said silver halide emulsion layer.

25. The photographic assemblage of claim 24 wherein said ballasted yellow dye releaser has the formula:

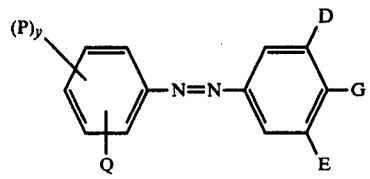

wherein:
G is hydroxy or a hydrolyzable ester group having the formula

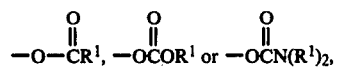

where each $R^1$ is independently alkyl of 1 to 8 carbon atoms, aryl of 6 to 12 carbon atoms or a group which together with the

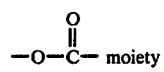 moiety is the ballasted carrier moiety;
D is an electron withdrawing group selected from halogen, nitro, cyano, lower perfluoroalkyl, $-SO_2R^8$, $-SO_2N(R^9)_2$ or $-COOR^9$;
E is a strong electron withdrawing group selected from nitro, cyano, lower perfluoroalkyl, $-SO_2R^8$, $-SO_2N(R^9)_2$ or $-COOR^9$;
P is independently $-COOR^9$, $-SO_2N(R^9)_2$ or $-CON(R^9)_2$;
y is an integer of 0 to 2;
$R^8$ is lower alkyl or lower aryl;
$R^9$ is, independently, hydrogen, lower alkyl, lower hydroxyalkyl, lower carboxyalkyl, lower aryl, or one of $R^9$ is a group which together with the

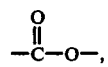

$-SO_2N-$ or $-CON-$ moiety to which it is attached is the ballasted carrier moiety; or both $R^9$ radicals form a 5- or 6-membered heterocyclic ring with the nitrogen atom to which they are attached;
Q is hydrogen, or a halogen, carboxy, lower alkyl or lower alkoxy substituent; and
at least one of G, D, E or P contains the ballasted carrier moiety.

26. The photographic assemblage of claim 25 wherein:
G is hydroxy or a hydrolyzable ester having the formula $-OCOR^{10}$ where $R^{10}$ is alkyl of 1 to 8 carbon atoms or aryl of 6 to 12 carbon atoms;
D is an electron withdrawing group selected from halogen, cyano or $-SO_2R^8$ where $R^8$ is lower alkyl or lower aryl;

E is a strong electron withdrawing group selected from nitro, cyano, —SO$_2$R$^8$ or —SO$_2$N(R$^{11}$)$_2$, where R$^8$ is as defined above and each R$^{11}$ is independently hydrogen, lower alkyl, lower hydroxyalkyl or lower carboxyalkyl, or together both R$^{11}$ radicals form a 5- or 6-membered heterocyclic ring with the nitrogen atom to which they are attached;

Q is hydrogen, halogen, carboxy, lower alkyl or lower alkoxy;

P is the ballasted carrier moiety; and y is 1.

27. The photographic assemblage of claim 26 wherein the ballasted carrier moiety represented by P has the structure:

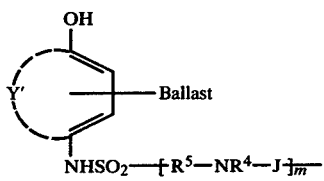

wherein:
Ballast is an organic ballasting radical of such molecular size and configuration as to render said compound nondiffusible in said photographic element during development in an alkaline processing composition;

Y' represents the atoms necessary to complete a benzene or naphthalene nucleus;

R$^5$ is an alkylene radical having 1 to about 8 carbon atoms, a phenylene radical, or a substituted phenylene radical having 6 to about 9 carbon atoms;

R$^4$ is a hydrogen atom or an alkyl group having 1 to about 6 carbon atoms;

J is sulfonyl; and m is 0 or 1.

28. The photographic assemblage of claim 26 wherein said ballasted yellow dye releaser has the formula:

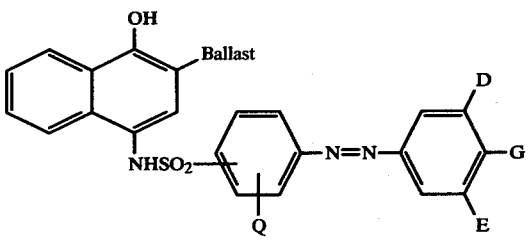

wherein:
Ballast is an organic ballasting radical of such molecular size and configuration as to render said compound nondiffusible in said photographic element during development in an alkaline processing composition;

G is hydroxy or a hydrolyzable ester having the formula —OCOR$^{10}$ where R$^{10}$ is alkyl of 1 to 8 carbon atoms or aryl of 6 to 12 carbon atoms;

D is halogen;

E is —SO$_2$N(R$^{11}$)$_2$ where each R$^{11}$ is independently hydrogen, lower alkyl or lower hydroxyalkyl; and Q is hydrogen or halogen.

29. A process for producing a photographic image comprising:
(a) treating an imagewise-exposed photographic element of claim 1 with an alkaline processing composition in the presence of a silver halide developing agent to effect development of each of the exposed silver halide emulsion layers, (b) said dye-releasing compound then releasing said diffusible yellow azophenol dye imagewise as a function of development of each of said silver halide emulsion layers;

(c) at least a portion of said imagewise distribution of said yellow azophenol dye diffusing out of the layer in which it is coated.

30. A process for producing a photographic image comprising:
(a) treating an imagewise-exposed photographic element of claim 7 with an alkaline processing composition in the presence of a silver halide developing agent to effect development of each of the exposed silver halide emulsion layers, thereby oxidizing said developing agent;

(b) said oxidized developing agent thereby cross-oxidizing said dye-releasing compound;

(c) said cross-oxidized dye-releasing compound then cleaving as a result of alkaline hydrolysis to release said diffusible yellow azophenol dye imagewise as a function of said imagewise exposure of each of said silver halide emulsion layers; and (d) at least a portion of said imagewise distribution of said yellow azophenol dye diffusing out of the layer in which it is coated.

31. A process of claim 30 wherein after cleaving from the dye-releasing compound the diffusible yellow azophenol dye diffuses to a dye-image-receiving layer to provide a transfer image.

32. A process of claim 30 wherein after cleaving from the dye-releasing compound the diffusible yellow azophenol dye or dye precursor is removed from the element and retaining in the element an imagewise distribution of dye releasing compound to provide a retained image.

33. A process of claim 32 wherein dye releasing compound retained in the element contains a dye precursor and the dye precursor is converted to a dye.

34. A process of claim 32 wherein silver and residual silver halide are removed from the element by bleaching and fixing.

35. A photographic element comprising a support having thereon at least one photosensitive silver halide emulsion layer, said emulsion layer having associated therewith a nondiffusible compound having a releasable yellow azophenol dye moiety which is diffusible under alkaline conditions when released from the compound, said compound having the formula:

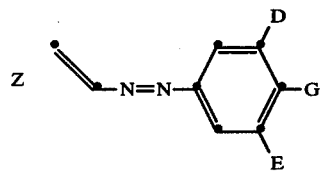

wherein:
D is an electron withdrawing group selected from halogen, nitro, cyano, carboxy, sulfonyl, sulfamoyl, or lower perfluoroalkyl;

E is a strong electron withdrawing group selected from nitro, cyano, carboxy, sulfonyl, sulfamoyl or lower perfluoroalkyl;

G is hydroxy or a hydrolyzable precursor thereof;

Z represents the atoms necessary to complete an aromatic carbocyclic or heterocyclic nucleus having at least one ring of 5 to 7 atoms;

and, attached to one of the rings, a ballasted carrier moiety capable of releasing said diffusible yellow azophenol dye under alkaline conditions as a function of development of said silver halide emulsion layer, the ballasted carrier moiety being a group having the formula:

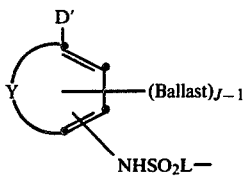

wherein:
(a) Ballast is an organic ballasting radical of such molecular size and configuration as to render said compound nondiffusible in said photographic element during development in an alkaline processing composition;
(b) D' is $OR^2$ or $NHR^3$ wherein $R^2$ is hydrogen or a hydrolyzable moiety and $R^3$ is hydrogen or a substituted or unsubstituted alkyl group of 1 to 22 carbon atoms;
(c) $-NHSO_2L-$ is ortho or para to D';
(d) Y represents the atoms necessary to complete a benzene nucleus, a naphthalene nucleus, or a one or two ringed heterocyclic ring system containing 5 to 7 members in each ring;
(e) j is a positive integer of 1 to 2 and is 2 when D' is $OR^2$ or when $R^3$ is hydrogen or an alkyl group of less than 8 carbon atoms; and
(f) L is a linking group represented by $-[X-(NR^4-J)_q]_m-$ or $-X-J-NR^4-$ wherein:
(i) X represents a bivalent linking group of the formula $-R^5-L'_n-R^5_p-$ where each $R^5$ can be the same or different and each represents an alkylene radical having 1 to about 8 carbon atoms; a phenylene radical; or a substituted phenylene radical having 6 to about 9 carbon atoms;
(ii) L' represents a bivalent radical selected from oxy, carbonyl, carboxamido, carbamoyl, sulfonamido, ureylene, sulfamoyl, sulfinyl or sulfonyl;
(iii) n is an integer of 0 or 1;
(iv) p is 1 when n equals 1 and p is 1 or 0 when n equals 0, provided that when p is 1 the carbon content of the sum of both $R^5$ radicals does not exceed 14 carbon atoms;
(v) $R^4$ represents a hydrogen atom, or an alkyl radical having 1 to about 6 carbon atoms;
(vi) J represents a bivalent radical selected from sulfonyl or carbonyl;
(vii) q represents an integer of 0 or 1; and
(viii) m represents an integer of 0, 1 or 2.

36. A photographic element comprising a support having thereon at least one photosensitive silver halide emulsion layer, said emulsion layer having associated therewith a non diffusible compound having a releasable yellow azophenol dye moiety which is diffusible under alkaline conditions when released from the compound, said compound having the formula:

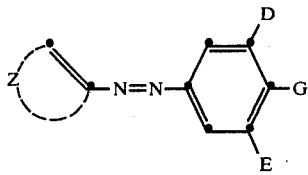

wherein:
D is an electron withdrawing group selected from halogen, nitro, cyano, carboxy, sulfonyl, sulfamoyl, or lower perfluoroalkyl;
E is a strong electron withdrawing group selected from nitro, cyano, carboxy, sulfonyl, sulfamoyl or lower perfluoroalkyl;
G is hydroxy or a hydrolyzable precursor thereof;
Z represents the atoms necessary to complete an aromatic carbocyclic or heterocyclic nucleus having at least one ring of 5 to 7 atoms;

and, attached to one of the rings, a ballasted carrier moiety capable of releasing said diffusible yellow azophenol dye under alkaline conditions as a function of development of said silver halide emulsion layer, the ballasted carrier moiety being a group having the formula:

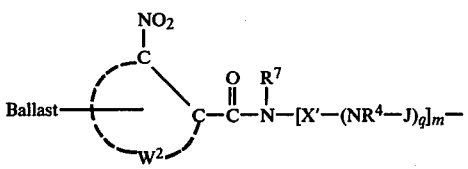

wherein:
Ballast is an organic ballasting radical of such molecular size and configuration as to render the compound nondiffusible in a photographic element during development in an alkaline processing composition;
$W^2$ represents the atoms necessary to complete a benzene nucleus;
$R^7$ is an alkyl radical having 1 to 4 carbon atoms;
X' is an alkylene group of 1 to 4 carbon atoms;
$R^4$ represents a hydrogen atom, or an alkyl radical having 1 to 6 carbon atoms;
J represents a bivalent radical selected from sulfonyl or carbonyl;
q represents an integer of 0 or 1; and
m represents an integer of 0, 1 or 2.

37. A photographic element comprising a support having thereon at least one photosensitive silver halide emulsion layer, said emulsion layer having associated therewith a non diffusible compound having a releasable yellow azophenol dye moiety which is diffusible under alkaline conditions when released from the compound, said compound having the formula:

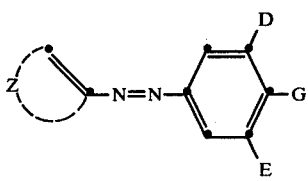

wherein:

D is an electron withdrawing group selected from halogen, nitro, cyano, carboxy, sulfonyl, sulfamoyl, or lower perfluoroalkyl;

E is a strong electron withdrawing group selected from nitro, cyano, carboxy, sulfonyl, sulfamoyl or lower perfluoroalkyl;

G is hydroxy or a hydrolyzable precursor thereof;

Z represents the atoms necessary to complete an aromatic carbocyclic or heterocyclic nucleus having at least one ring of 5 to 7 atoms;

and, attached to one of the rings, a ballasted carrier moiety capable of releasing said diffusible yellow azophenol dye under alkaline conditions as a function of development of said silver halide emulsion layer, the ballasted carrier moiety being a group having the formula:

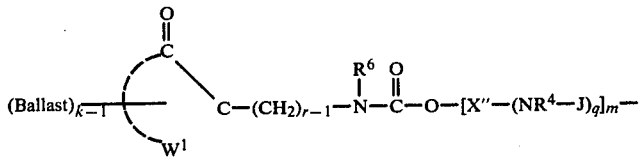

wherein:
Ballast is an organic ballasting radical of such molecular size and configuration as to render the compound nondiffusible in a photographic element during development in an alkaline processing composition;

$W^1$ represents the atoms necessary to complete a quinone nucleus;

r is a positive integer of 1 or 2;

$R^6$ is an alkyl radical having 1 to 40 carbon atoms or an aryl radical having 6 to 40 carbon atoms;

k is a positive integer of 1 to 2 and is 2 when $R^6$ is a radical of less than 8 carbon atoms;

X'' is a phenylene or substituted phenylene radical of 6 to 9 carbon atoms; and $R^4$ represents a hydrogen atom, or an alkyl radical having 1 to 6 carbon atoms;

J represents a bivalent radical selected from sulfonyl or carbonyl;

q represents an integer of 0 or 1; and m represents an integer of 0, 1 or 2.

* * * * *

UNITED STATES PATENT AND TRADEMARK OFFICE
CERTIFICATE OF CORRECTION

PATENT NO. : 4,156,609

DATED : May 29, 1979

INVENTOR(S) : Richard A. Landholm and Jerry M. Robbins

It is certified that error appears in the above-identified patent and that said Letters Patent are hereby corrected as shown below:

Column 2, line 6, that part of the formula reading

 should read  .

Column 8, line 35, "1 and" should read ---1 to---.

Columns 17-18, Table II, under heading E, last line, Dye 13, that part of the formula reading "NHSOCH$_3$" should read --- NHSO$_2$CH$_3$ ---.

Column 19, line 5, that part of the formula reading

| (Ballast)$_{j-1}$    should read    --|--(Ballast)$_{j-1}$

Column 20, line 34, "light-reading imge" should read --- right-reading image ---.

UNITED STATES PATENT AND TRADEMARK OFFICE
CERTIFICATE OF CORRECTION

PATENT NO. : 4,156,609

DATED : May 29, 1979

INVENTOR(S) : Richard A. Landholm and Jerry M. Robbins

It is certified that error appears in the above-identified patent and that said Letters Patent are hereby corrected as shown below:

Column 27, line 46, "dr" should read ---dry---.

Column 29, line 15, "1/4" should read --- 1/2 ---.

Column 35, line 49, $-\overset{O}{\underset{\|}{C}}R^1, -\overset{O}{\underset{\|}{C}}OR^1$ should read $-O\overset{O}{\underset{\|}{C}}R^1, -O\overset{O}{\underset{\|}{C}}OR^1$.

Column 40, line 56, that part of the formula reading

 should read 

Signed and Sealed this

Thirteenth Day of November 1979

[SEAL]

Attest:

RUTH C. MASON
Attesting Officer

LUTRELLE F. PARKER
Acting Commissioner of Patents and Trademarks